United States Patent
Reynolds et al.

(10) Patent No.: US 10,809,843 B2
(45) Date of Patent: Oct. 20, 2020

(54) TOUCH SENSOR SIGNAL INTEGRATION

(71) Applicant: Atmel Corporation, Chandler, AZ (US)

(72) Inventors: Grahame Reynolds, Southampton (GB); Hammad Syed, Southampton (GB)

(73) Assignee: Atmel Corporation, Chandler, AZ (US)

( * ) Notice: Subject to any disclaimer, the term of this patent is extended or adjusted under 35 U.S.C. 154(b) by 418 days.

(21) Appl. No.: 15/355,544

(22) Filed: Nov. 18, 2016

(65) Prior Publication Data

US 2018/0143727 A1     May 24, 2018

(51) Int. Cl.
*G06F 3/041*     (2006.01)
*G02F 1/1333*    (2006.01)
(Continued)

(52) U.S. Cl.
CPC ........ *G06F 3/0416* (2013.01); *G02F 1/13338* (2013.01); *G02F 1/134309* (2013.01); *G06F 3/044* (2013.01); *G06F 3/0412* (2013.01); *G06F 3/0418* (2013.01); *G02F 1/13439* (2013.01); *G06F 2203/04108* (2013.01); *G06F 2203/04111* (2013.01)

(58) Field of Classification Search
None
See application file for complete search history.

(56) References Cited

U.S. PATENT DOCUMENTS

| | | |
|---|---|---|
| 7,663,607 B2 | 2/2010 | Hotelling |
| 7,864,503 B2 | 1/2011 | Chang |
| | (Continued) | |

FOREIGN PATENT DOCUMENTS

| | | |
|---|---|---|
| WO | WO 2012/129247 A2 | 9/2012 |
| WO | 2015050888 A1 | 4/2015 |

OTHER PUBLICATIONS

International Search Report and Written Opinion of the International Searching Authority, Patent Cooperation Treaty, International Application No. PCT/US2017/061908, dated Feb. 27, 2018, 12 pages.
(Continued)

*Primary Examiner* — Amare Mengistu
*Assistant Examiner* — Sarvesh J Nadkarni
(74) *Attorney, Agent, or Firm* — TraskBritt

(57) ABSTRACT

In certain embodiments, a method includes performing a first positive integration by sensing a first rising edge of a charging signal of a touch sensor during a first synchronization period and performing a first negative integration by sensing a first falling edge of the charging signal during a second synchronization period. The method also includes toggling the charging signal, resulting in a second rising edge of the charging signal during the second synchronization period. The method further includes performing a second negative integration by sensing a second falling edge of the charging signal during a third synchronization period and performing a second positive integration by sensing a third rising edge of the charging signal during a fourth synchronization period. The first integrations are associated with a first sample measurement and the second integrations are associated with a second sample measurement.

17 Claims, 6 Drawing Sheets

(51) Int. Cl.
*G02F 1/1343* (2006.01)
*G06F 3/044* (2006.01)

(56) References Cited

U.S. PATENT DOCUMENTS

| | | | |
|---|---|---|---|
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 8,217,902 | B2 | 7/2012 | Chang |
| 8,723,824 | B2 | 5/2014 | Myers |
| 2008/0309635 | A1 | 12/2008 | Matsuo |
| 2009/0315854 | A1 | 12/2009 | Matsuo |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |
| 2013/0076612 | A1 | 3/2013 | Myers |
| 2013/0293491 | A1* | 11/2013 | Doi .................. G06F 3/044 345/173 |
| 2018/0121019 | A1* | 5/2018 | Lee .................. G06F 3/0418 |

OTHER PUBLICATIONS

International Search Report and Written Opinion of the International Searching Authority, Patent Cooperation Treaty, International Application No. PCT/US2017/061909, dated Feb. 27, 2018, 11 pages.
U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.
U.S. Appl. No. 15/355,383, filed Nov. 18, 2016, Grahame Reynolds.

* cited by examiner

TOUCH SENSOR SIGNAL INTEGRATION

TECHNICAL FIELD

This disclosure generally relates to touch sensors.

BACKGROUND

According to an example scenario, a touch sensor detects the presence and position of an object (e.g., a user's finger or a stylus) within a touch-sensitive area of touch sensor of a device. In a touch-sensitive-display application, a touch sensor allows a user to interact directly with what is displayed on a display screen, rather than indirectly with a mouse or touch pad. A touch sensor may be attached to or provided as part of a desktop computer, laptop computer, tablet computer, personal digital assistant ("PDA"), smartphone, satellite navigation device, portable media player, portable game console, kiosk computer, point-of-sale device, or other device. A control panel on a household or other appliance may include a touch sensor.

There are a number of different types of touch sensors, such as for example resistive touch sensors, surface acoustic wave touch sensors, and capacitive touch sensors. In one example, when an object physically touches a touch screen within a touch sensitive area of a touch sensor of the touch screen (e.g., by physically touching a cover layer overlaying a touch sensor array of the touch sensor) or comes within a detection distance of the touch sensor (e.g., by hovering above the cover layer overlaying the touch sensor array of the touch sensor), a change in capacitance may occur within the touch screen at a position of the touch sensor of the touch screen that corresponds to the position of the object within the touch sensitive area of the touch sensor. A touch sensor controller processes the change in capacitance to determine the position of the change of capacitance within the touch sensor.

DESCRIPTION OF EXAMPLE EMBODIMENTS

In one embodiment, a device includes a touch sensor. The touch sensor includes a plurality of electrodes. The device further includes a controller coupled to the touch sensor. The controller includes logic configured, when executed, to cause the controller to perform, among other possible operations, the following: a first positive integration by sensing a first rising edge of a charging signal associated with an electrode of the plurality of electrodes during a first synchronization period, and a first negative integration by sensing a first falling edge of the charging signal associated with the electrode of the plurality of electrodes during a second synchronization period. The logic is also configured, when executed, to cause the controller to toggle the charging signal, resulting in a second rising edge of the charging signal during the second synchronization period. The first positive integration and the first negative integration are associated with a first sample measurement. The logic is further configured, when executed, to cause the controller to perform the following: a second negative integration by sensing a second falling edge of the charging signal associated with the electrode of the plurality of electrodes during a third synchronization period, and a second positive integration by sensing a second rising edge of the charging signal associated with the electrode of the plurality of electrodes during a fourth synchronization period. The second positive integration and the second negative integration are associated with a second sample measurement.

Figure 1A:
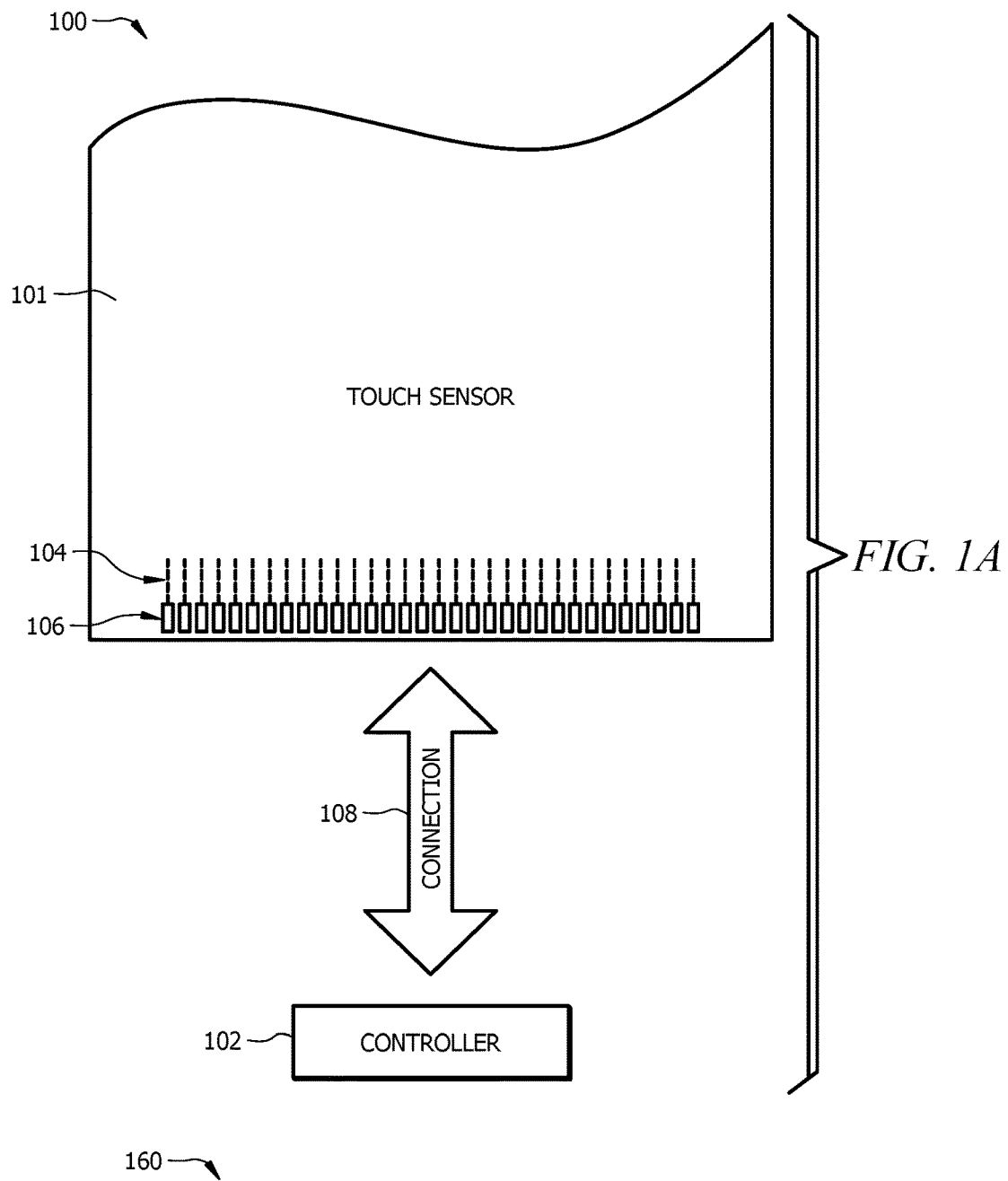
FIG. 1A illustrates an example system that includes a touch sensor and a controller in accordance with embodiments of the present disclosure

FIG. 1A illustrates an example system 100 that includes a touch sensor and a controller in accordance with embodiments of the present disclosure. Touch sensor system 100 comprises a touch sensor 101 and a touch sensor controller 102 that are operable to detect the presence and position of a touch or the proximity of an object within a touch-sensitive area of touch sensor 101. Touch sensor 101 includes one or more touch-sensitive areas. In one embodiment, touch sensor 101 includes an array of electrodes disposed on one or more substrates, which may be made of a dielectric material. Reference to a touch sensor may encompass both the electrodes of touch sensor 101 and the substrate(s) on which they are disposed. Alternatively, reference to a touch sensor may encompass the electrodes of touch sensor 101, but not the substrate(s) on which they are disposed.

The electrodes of touch sensor 101 include a conductive material forming a shape, such as a disc, square, rectangle, thin line, diamond, other shape, or a combination of these shapes. One or more cuts in one or more layers of conductive material may (at least in part) create the shape of an electrode, and the area of the shape may (at least in part) be bounded by those cuts. In certain embodiments, the conductive material of an electrode occupies approximately 100% of the area of its shape. For example, an electrode may be made of indium tin oxide (ITO) and the ITO of the electrode may occupy approximately 100% of the area of its shape (sometimes referred to as 100% fill). In certain embodiments, the conductive material of an electrode occupies less than 100% of the area of its shape. For example, an electrode may be made of fine lines of metal or other conductive material (FLM), such as for example copper, silver, carbon, or a copper-, silver-, or carbon-based material, and the fine lines of conductive material may occupy only a few percent (e.g., approximately 5%) of the area of its shape in a hatched, mesh, or other pattern. Although this disclosure describes or illustrates particular electrodes made of particular conductive material forming particular shapes with particular fill percentages having particular patterns, this disclosure contemplates electrodes made of any appropriate conductive material forming any appropriate shapes with any appropriate fill percentages having any suitable patterns.

The shapes of the electrodes (or other elements) of a touch sensor 101 constitute, in whole or in part, one or more macro-features of touch sensor 101. One or more characteristics of the implementation of those shapes (such as, for example, the conductive materials, fills, or patterns within the shapes) constitute in whole or in part one or more micro-features of touch sensor 101. One or more macro-features of touch sensor 101 may determine one or more characteristics of its functionality, and one or more micro-features of touch sensor 101 may determine one or more optical features of touch sensor 101, such as transmittance, refraction, or reflection.

The electrodes of a touch sensor 101 may be configured in any pattern (e.g., a grid pattern or a diamond pattern). Each configuration may include a first set of electrodes and a second set of electrodes. The first set of electrodes and the second set of electrodes overlap to form a plurality of capacitive nodes. In certain embodiments, the first set of electrodes are horizontal and the second set of electrodes are vertical. Although described in particular patterns, the electrodes of touch sensors according to the present disclosure may be in any appropriate pattern. In certain embodiments, for example, the first set of electrodes may be any appropriate angle to horizontal and the second set of electrodes may be any appropriate angle to vertical. This disclosure anticipates any appropriate pattern, configuration, design, or arrangement of electrodes and is not limited to the example patterns discussed above.

Although this disclosure describes a number of example electrodes, the present disclosure is not limited to these example electrodes and other electrodes may be implemented. Additionally, although this disclosure describes a number of example embodiments that include particular configurations of particular electrodes forming particular nodes, the present disclosure is not limited to these example embodiments and other configurations may be implemented. In one embodiment, a number of electrodes are disposed on the same or different surfaces of the same substrate. Additionally or alternatively, different electrodes may be disposed on different substrates. Although this disclosure describes a number of example embodiments that include particular electrodes arranged in specific, example patterns, the present disclosure is not limited to these example patterns and other electrode patterns may be implemented.

A mechanical stack contains the substrate (or multiple substrates) and the conductive material forming the electrodes of touch sensor 101. For example, the mechanical stack may include a first layer of optically clear adhesive (OCA) beneath a cover panel. The cover panel may be clear and made of a resilient material for repeated touching, such as for example glass, polycarbonate, or poly (methyl methacrylate) (PMMA). This disclosure contemplates the cover panel being made of any material. The first layer of OCA may be disposed between the cover panel and the substrate with the conductive material forming the electrodes. The mechanical stack may also include a second layer of OCA and a dielectric layer (which may be made of PET or another material, similar to the substrate with the conductive material forming the electrodes). As an alternative, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor 101 and touch sensor controller 102. For example, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm.

Although this disclosure describes a particular mechanical stack with a particular number of particular layers made of particular materials and having particular thicknesses, this disclosure contemplates other mechanical stacks with any number of layers made of any materials and having any thicknesses. For example, in one embodiment, a layer of adhesive or dielectric may replace the dielectric layer, second layer of OCA, and air gap described above, with there being no air gap in the display.

One or more portions of the substrate of touch sensor 101 may be made of polyethylene terephthalate (PET) or another material. This disclosure contemplates any substrate with portions made of any material(s). In one embodiment, one or more electrodes in touch sensor 101 are made of ITO in whole or in part. Additionally or alternatively, one or more electrodes in touch sensor 101 are made of fine lines of metal or other conductive material. For example, one or more portions of the conductive material may be copper or copper-based and have a thickness of approximately 5 microns ($\mu$m) or less and a width of approximately 10 $\mu$m or less. As another example, one or more portions of the conductive material may be silver or silver-based and similarly have a thickness of approximately 5 $\mu$m or less and a width of approximately 10 $\mu$m or less. This disclosure contemplates any electrodes made of any materials.

Touch sensor controller 102 is connected to touch sensor 101 by connection 108 according to an embodiment of the present disclosure. In an embodiment, touch sensor controller 102 is electrically coupled to touch sensor 101 through connection pads 106. In some embodiments, touch sensor controller 102 includes one or more memory units and one or more processors. In certain of those embodiments, the one or more memory units and the one or more processors are electrically interconnected so that they interdependently operate. The one or more memory units and the one or more processors are electrically coupled to touch sensor 101, allowing touch sensor 101 to send and receive electrical signals to and from touch sensor 101.

In one embodiment, touch sensor 101 implements a capacitive form of touch sensing. In a mutual-capacitance implementation, touch sensor 101 may include an array of drive and sense electrodes forming an array of capacitive nodes. Touch sensor 101 may have drive electrodes disposed in a pattern on one side of one substrate and sense electrodes disposed in a pattern on one side of another substrate. In such configurations, an intersection of a drive electrode and a sense electrode forms a capacitive node. Such an intersection may be a position where the drive electrode and the sense electrode "cross" or come nearest each other in their respective planes. The drive and sense electrodes forming the capacitive node are positioned near each other but do not make electrical contact with each other. Instead, in response to a signal being applied to the drive electrodes for example, the drive and sense electrodes capacitively couple to each other across a space between them.

A charging signal, which is a pulsed or alternating voltage, applied to the drive electrode (by touch sensor controller 102) induces a charge on the sense electrode, and the amount of charge induced is susceptible to external influence (such as a touch or the proximity of an object). When an object touches or comes within proximity of the capacitive node, a change in capacitance may occur at the capacitive node and touch sensor controller 102 measures the change in capacitance. By measuring changes in capacitance throughout touch sensor 101, touch sensor controller 102 determines the position of the touch or proximity within touch-sensitive areas of touch sensor 101.

In a self-capacitance implementation, touch sensor 101 may include an array of electrodes of a single type that may each form a capacitive node. When an object touches or comes within proximity of the capacitive node, a change in self-capacitance may occur at the capacitive node and touch sensor controller 102 measures the change in capacitance, for example, as a change in the amount of charge induced by the charging signal to raise the voltage at the capacitive node by a predetermined amount. As with a mutual-capacitance implementation, by measuring changes in capacitance throughout the array, touch sensor controller 102 determines the position of the touch or proximity within touch-sensitive areas of touch sensor 101. This disclosure contemplates any form of capacitive touch sensing.

Although this disclosure describes particular configurations of particular electrodes forming particular nodes, this disclosure contemplates other configurations of electrodes forming nodes. Moreover, this disclosure contemplates other electrodes disposed on any number of substrates in any patterns.

As described above, a change in capacitance at a capacitive node of touch sensor 101 may indicate a touch or proximity input at the position of the capacitive node. Touch sensor controller 102 detects and processes the change in capacitance to determine the presence and position of the touch or proximity input. In one embodiment, touch sensor controller 102 then communicates information about the touch or proximity input to one or more other components (such as one or more central processing units (CPUs)) of a device, which may include touch sensor 101 and touch sensor controller 102, and which may respond to the touch or proximity input by initiating a function of the device (or an application running on the device). Although this disclosure describes a particular touch sensor controller 102 having particular functionality with respect to a particular device and a particular touch sensor 101, this disclosure contemplates other touch sensor controllers having any functionality with respect to any device and any touch sensor.

In one embodiment, touch sensor controller 102 is implemented as one or more integrated circuits (ICs), such as for example general-purpose microprocessors, microcontrollers, programmable logic devices or arrays, or application-specific ICs (ASICs). Touch sensor controller 102 comprises any combination of analog circuitry, digital logic, and digital non-volatile memory. In one embodiment, touch sensor controller 102 is disposed on a flexible printed circuit (FPC) bonded to the substrate of touch sensor 101, as described below. The FPC may be active or passive. In one embodiment, multiple touch sensor controllers 102 are disposed on the FPC.

In an example implementation, touch sensor controller 102 includes a processor unit, a drive unit, a sense unit, and a storage unit. In such an implementation, the drive unit supplies drive signals to the drive electrodes of touch sensor 101, and the sense unit senses charge at the capacitive nodes of touch sensor 101 and provides measurement signals to the processor unit representing capacitances at the capacitive nodes. The processor unit controls the supply of drive signals to the drive electrodes by the drive unit and processes measurement signals from the sense unit to detect and process the presence and position of a touch or proximity input within touch-sensitive areas of touch sensor 101. The processor unit may also track changes in the position of a touch or proximity input within touch-sensitive areas of touch sensor 101. The storage unit stores programming for execution by the processor unit, including programming for controlling the drive unit to supply drive signals to the drive electrodes, programming for processing measurement signals from the sense unit, and other programming. Although this disclosure describes a particular touch sensor controller 102 having a particular implementation with particular components, this disclosure contemplates touch sensor controller having other implementations with other components.

Connecting lines 104, formed in one example of conductive material disposed on the substrate of touch sensor 101, couple the drive or sense electrodes of touch sensor 101 to connection pads 106, also disposed on the substrate of touch sensor 101. As described below, connection pads 106 facilitate coupling of connecting lines 104 to touch sensor controller 102. Connecting lines 104 may extend into or around (e.g., at the edges of) touch-sensitive areas of touch sensor 101. In one embodiment, particular connecting lines 104 provide drive connections for coupling touch sensor controller 102 to drive electrodes of touch sensor 101, through which the drive unit of touch sensor controller 102 supplies drive signals to the drive electrodes, and other connecting lines 104 provide sense connections for coupling touch sensor controller 102 to sense electrodes of touch sensor 101, through which the sense unit of touch sensor controller 102 senses charge at the capacitive nodes of touch sensor 101.

Connecting lines 104 are made of fine lines of metal or other conductive material. For example, the conductive material of connecting lines 104 may be copper or copper-based and have a width of approximately 100 µm or less. As another example, the conductive material of connecting lines 104 may be silver or silver-based and have a width of approximately 100 µm or less. In one embodiment, connecting lines 104 are made of ITO in whole or in part in addition or as an alternative to the fine lines of metal or other conductive material. Although this disclosure describes particular tracks made of particular materials with particular widths, this disclosure contemplates tracks made of other materials and/or other widths. In addition to connecting lines 104, touch sensor 101 may include one or more ground lines terminating at a ground connector (which may be a connection pad 106) at an edge of the substrate of touch sensor 101 (similar to connecting lines 104).

Connection pads 106 may be located along one or more edges of the substrate, outside a touch-sensitive area of touch sensor 101. As described above, touch sensor controller 102 may be on an FPC. Connection pads 106 may be made of the same material as connecting lines 104 and may be bonded to the FPC using an anisotropic conductive film (ACF). In one embodiment, connection 108 includes conductive lines on the FPC coupling touch sensor controller 102 to connection pads 106, in turn coupling touch sensor controller 102 to connecting lines 104 and to the drive or sense electrodes of touch sensor 101. In another embodiment, connection pads 106 are connected to an electro-mechanical connector (such as, for example, a zero insertion force wire-to-board connector). Connection 108 may or may not include an FPC. This disclosure contemplates any connection 108 between touch sensor controller 102 and touch sensor 101.

In certain embodiments, system 100 includes a display stack. The display stack of system 100 may include one or more layers associated with displaying an image to a user. As an example, the display stack may include a layer with elements that apply signals to a pixel layer of the display, a ground layer (also referred to as a common voltage (VCOM) layer), and/or a cover layer. In certain embodiments, the electrodes are placed underneath (from a user's perspective) pixel rows of the display stack's pixel layer. This disclosure contemplates the display being any display capable of presenting an image to a user, such as for example a liquid crystal display (LCD), an organic light-emitting diode (OLED) display, etc. In certain embodiments, touch sensor 101 is attached to the display (e.g., an LCD or OLED). In some embodiments, the display of system 100 is an in-cell display module, and touch sensor 101 and controller 102 (e.g., touch sensor circuitry and drive circuitry) are built into the display (e.g, LCD or OLED) module.

Figure 1B:
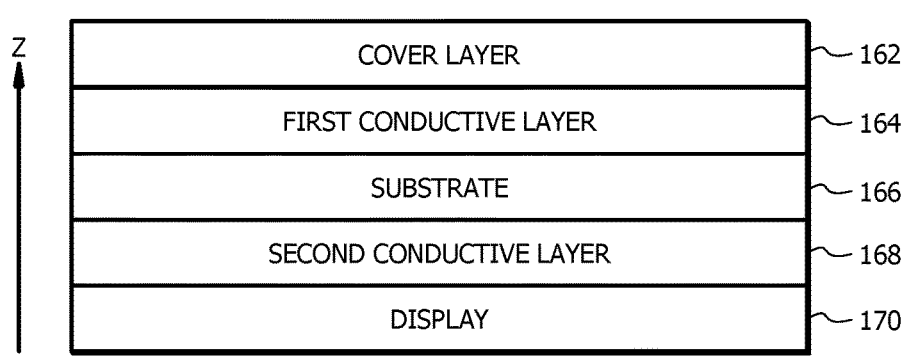
FIG. 1B illustrates an example mechanical stack for a touch sensor in accordance with embodiments of the present disclosure.

FIG. 1B illustrates an example mechanical stack 160 for a system 100 in accordance with embodiments of the present disclosure. In the example embodiment of FIG. 1B, the mechanical stack 160 includes multiple layers and is illustrated as positioned with respect to a z-axis. The example mechanical stack 160 includes a display 170, a second conductive layer 168, a substrate 166, a first conductive layer 164, and a cover layer 162.

In an embodiment, the second conductive layer 168 and first conductive layer 164 are drive and sense electrodes, respectively, as discussed above in connection with FIG. 1A. In an embodiment, the second conductive layer 168 and first conductive layer 164 are meshes as described in this disclosure. Substrate 166 comprises, in an embodiment, a material which electrically isolates the first and second conductive layers. In an embodiment, substrate 166 provides mechanical support for other layers. In an embodiment, additional layers of substrate (which, for example, may not be the same material as substrate 166) may be used in different configurations. For example, a second substrate layer may be located between second conductive layer 168 and display 170. The display 170 provides display information to be viewed by a user. As an example, display 170 may be an LCD, an OLED, or any other suitable type of display. In an embodiment, display 170 may be an alternating pixel display having subpixels arranged in an alternating pixel display pattern.

Cover layer 162 may be clear, or substantially clear, and made of a resilient material for repeated touching, such as for example glass, polycarbonate, or poly(methyl methacrylate) (PMMA). In an embodiment, a transparent or semi-transparent adhesive layer is placed between cover layer 162 and first conductive layer 164, and/or between second conductive layer 168 and display 170. A user may interact with system 100 by touching cover layer 162 using a finger or some other touch object (such as a stylus). A user may also interact with system 100 by hovering a finger or some other touch object over cover layer 162 without actually making physical contact with cover layer 162.

In the example embodiment of FIG. 1B, mechanical stack 160 comprises two conductive layers. In an embodiment, mechanical stack 160 may comprise a single conductive layer forming. Other embodiments of mechanical stack 160 may implement other configurations, relations, and perspectives, as well as fewer or additional layers. As one example, one or more of conductive layers 164 and 168 (and/or other layers of mechanical stack 160) may be integrated with display 170, such that the one or more of the conductive layers 164 and 168 are positioned within the layers that form display 170. In certain embodiments, the layers integrated with display 170 may provide operations for display 170 (e.g., for displaying an image) and for touch sensing. As another example, mechanical stack 160 may include multiple substrates 166, with first conductive layer 164 being positioned on a first substrate 166 and second conductive layer 168 being positioned on a second substrate 166.

Figure 2:
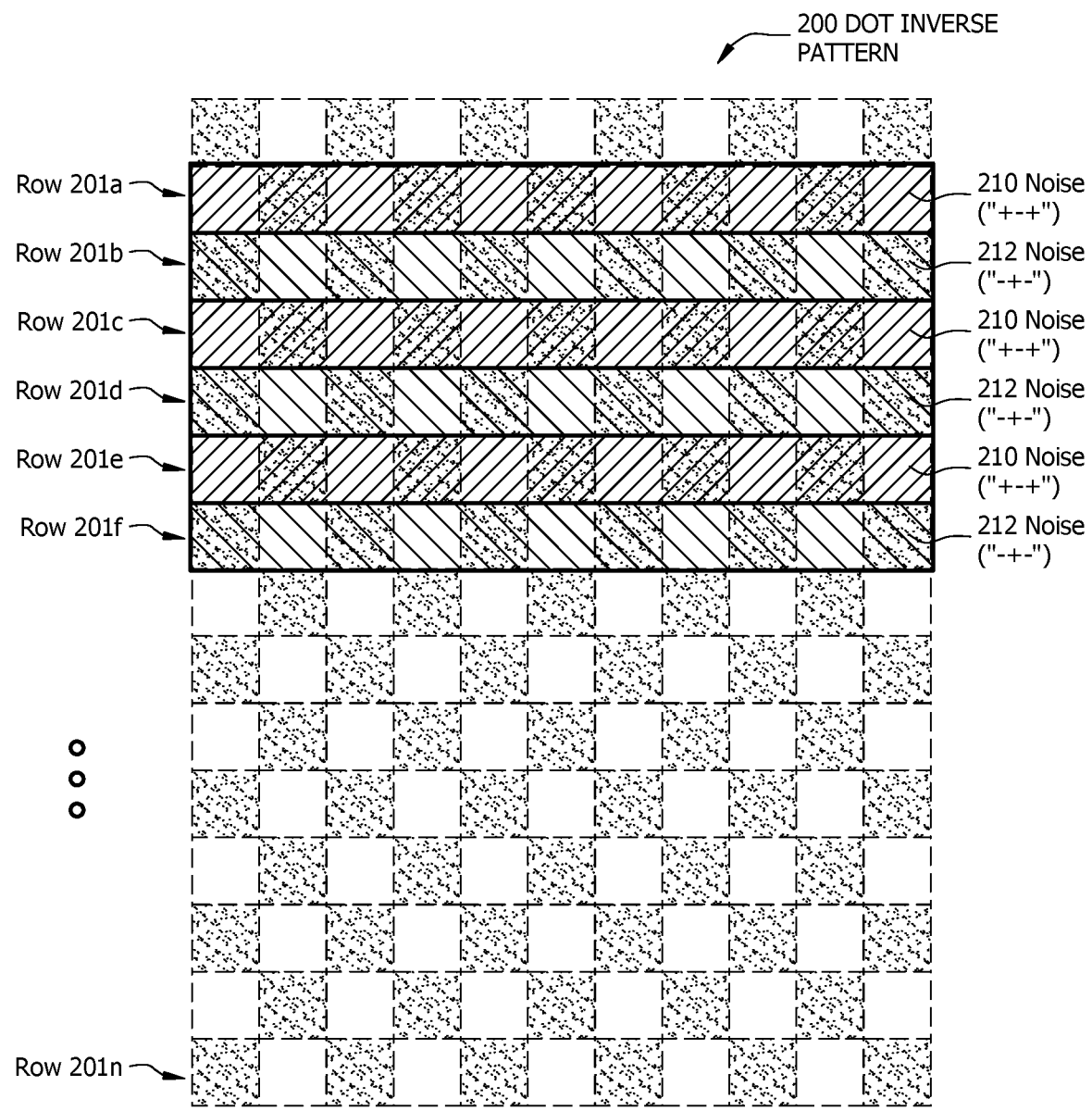
FIG. 2 illustrates an example dot inverse pixel pattern in accordance with embodiments of the present disclosure.

FIG. 2 illustrates an example dot inverse pattern 200 in accordance with embodiments of the present disclosure. Each square of dot inverse pattern 200 represents a pixel. Rows 201a-n of dot inverse pattern 200 correspond to pixel rows of a pixel layer of a display module of system 100. For example, row 201a of dot inverse pattern 200 corresponds to a first pixel row, row 201b of dot inverse pattern 200 corresponds to second pixel row, and so on. In certain embodiments, certain electrodes of touch sensor 101 are positioned horizontally underneath pixel rows 201a-n. For example, a first electrode may be positioned horizontally underneath row 201a, a second electrode may be positioned horizontally underneath adjacent row 201b, and so on. In certain embodiments, a single electrode may cover multiple pixel rows. For example, a first electrode may be positioned horizontally underneath several first pixel rows (e.g., 40 first pixel rows), a second electrode may be positioned horizontally underneath several second pixel rows (e.g., 40 second adjacent rows) adjacent to the first pixel rows, and so on.

In certain embodiments, several electrodes are electrically and/or physically coupled together to form a single electrode that may cover multiple pixel rows 201. As an example, a first electrode may include several electrodes positioned horizontally underneath several first pixel rows 201 (e.g., 40 first adjacent rows), a second electrode may include several electrodes positioned horizontally underneath several second pixel rows 201 (e.g., 40 second adjacent rows) adjacent to the first pixel rows 201, and so on.

In certain embodiments, noise generated by a display (e.g., an LCD or OLED) is not constant in time. As an image on the display is refreshed, the noise may follow a repeating pattern of noisy and quieter periods. A display comprising dot inverse pattern 200 may generate at least two types of noise. In the illustrated embodiment, alternating rows 201a, 201c, 201e, and so on of dot inverse pattern 200, as indicated by a forward slash hatch pattern, represent a first type of noise 210 (i.e., a "+ − +" noise pattern), and alternating rows 201b, 201d, 201f, and so on of dot inverse pattern 200, as indicated by a backslash hatch pattern, represent a second type of noise 212 (i.e., a "− + −" noise pattern). The "+" signal represents a positive amplitude peak and the "−" signal represents a negative amplitude peak. In certain embodiments, the degree of change for the positive amplitude peak measured from a zero reference equals the degree of change for the negative amplitude peak measured from a zero reference.

Figure 3:
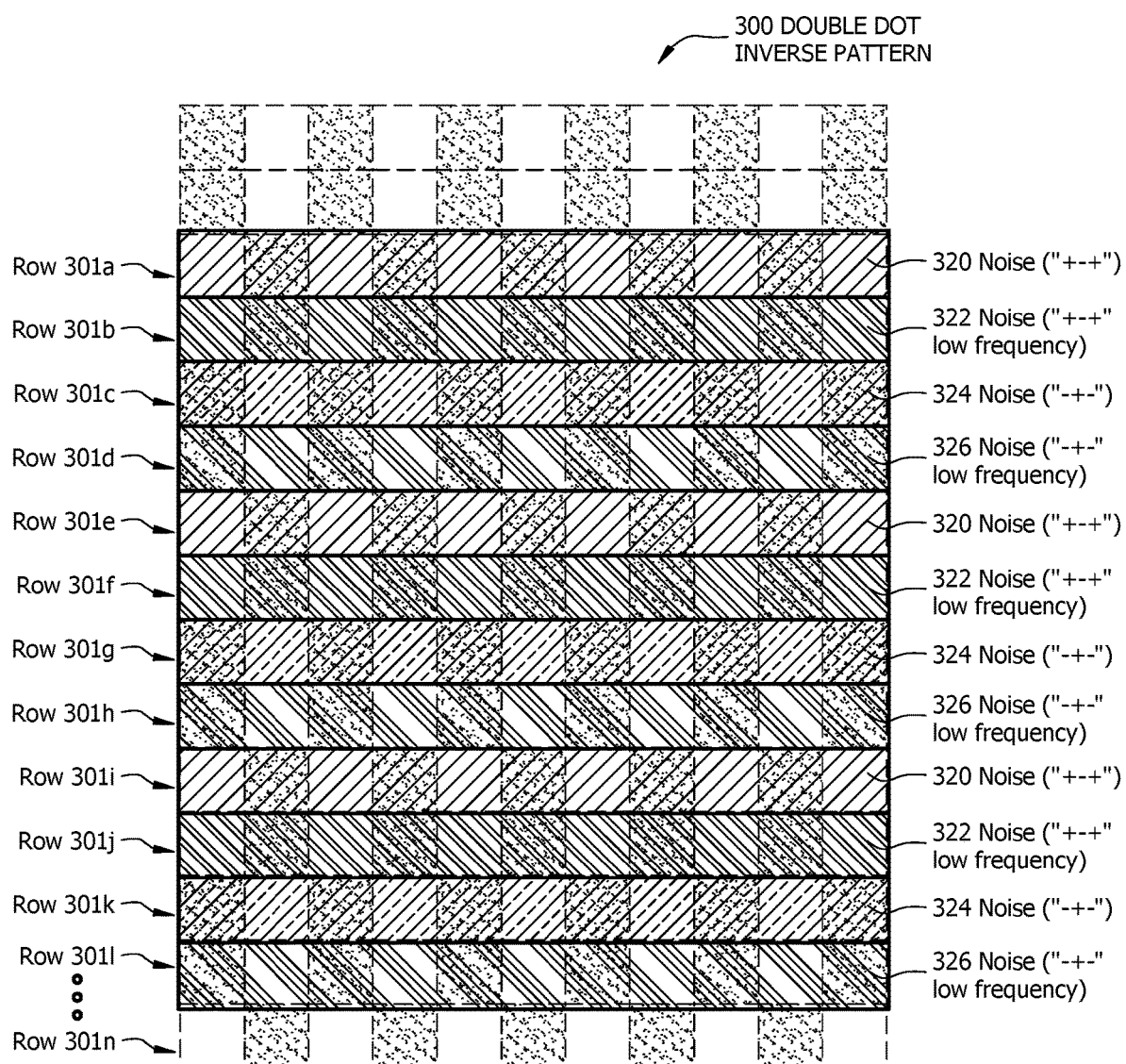
FIG. 3 illustrates an example double dot inverse pixel pattern in accordance with embodiments of the present disclosure.

FIG. 3 illustrates an example double dot inverse pattern 300 in accordance with embodiments of the present disclosure. Each square of double dot inverse pattern 300 represents a pixel. Rows 301 of double dot inverse pattern 300 correspond to pixel rows 301a-n of a pixel layer of a display module of system 100. For example, row 301a of double dot inverse pattern 300 corresponds to a first pixel row, row 301b of double dot inverse pattern 300 corresponds to second pixel row, and so on. A display (e.g., an LCD or OLED) comprising double dot inverse pattern 300 may generate four types of noise. In the illustrated embodiment, rows 301a, 301e, and 301i of double dot inverse pattern 300, as indicated by a forward slash hatch pattern, represent a first type of noise 320 (i.e., a "+ − +" regular amplitude pattern), rows 301b, 301f, and 301j of double dot inverse pattern 300, as indicated by a double backslash hatch pattern, represent a second type of noise (i.e., a "+ − +" low amplitude pattern), rows 301c, 301g, and 301k of double dot inverse pattern 300, as indicated by a forward slash broken line hatch pattern, represent a third type of noise (i.e., a "− + −" regular amplitude pattern), and rows 301d, 301h, and 301l of double dot inverse pattern 300, as indicated by a quadruple backslash hatch pattern, represent a fourth type of noise (i.e., a "− + −" low amplitude pattern). In certain embodiments, the degree of change for the positive (+) regular amplitude peak measured from a zero reference equals the degree of change for the negative (−) regular amplitude peak measured from the zero reference. Similarly, the degree of change for the positive (+) low amplitude peak measured from a zero reference equals the degree of change for the negative (−) low amplitude peak measured from the zero reference.

Figure 4:
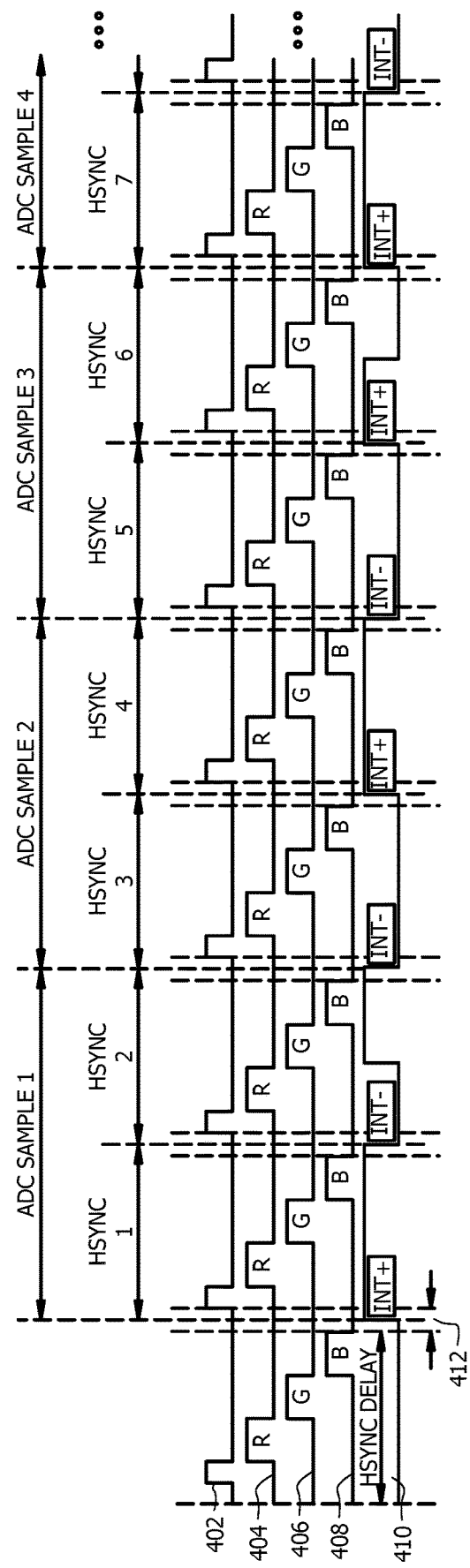
FIG. 4 illustrates an example integration sequence in accordance with embodiments of the present disclosure.

FIG. 4 illustrates an example integration sequence in accordance with embodiments of the present disclosure. The integration sequence illustrated in FIG. 4 may be used by system 100. In certain embodiments, the integration sequence reduces or eliminates flicker on displays that include certain pixel patterns (e.g., dot inverse pattern 200 and/or double dot inverse pattern 300) while reducing or eliminating any reduction in the touch measurement performance. FIG. 4 shows one HSYNC signal 402 and three color signals: red write signal 404, green write signal 406, and blue write signal 408.

To update a display of system 100, controller 102 may use synchronization signals to control the pixels on the display. To facilitate locating by the display controller the position corresponding to each pixel data, controller 102 may use a horizontal synchronization (HSYNC) signal to indicate the start of a pixel line. Essentially, the HSYNC signal acts as a clock signal. For example, a start of a new pixel line and can be triggered by the rising edges (e.g., the change from a low level state to a high level state) of the timing pulses of the HSYNC signal. Accordingly, when controller 102 detects the rising edge of one of the timing pulses of the HSYNC signal, the subsequent pixel data received will be interpreted as belonging to the next pixel line. Controller 102 will then update that pixel line. One of ordinary skill in the art will appreciate that in another embodiment, falling edges of the HSYNC pulse can be used by controller 102 to initiate a new pixel line.

Synchronization to HSYNC signals may reduce or eliminate display noise in touch measurements. Without this synchronization, charge may be inserted or removed on the pixel capacitor due to the rising and falling edges of a charging signal (e.g., charging signal 410), which may cause a fluctuation in capacitor voltage. This fluctuation may result in a change in luminance intensity and/or color intensity (e.g., Red/Green/Blue emitted intensity) of the display. By using HSYNC delay as shown in FIG. 4, controller 102 scans during quiet periods when source data is not updating the pixel area (e.g., red write signal 404, green write signal 406, and blue write signal 408), which may reduce or eliminate display noise. In the embodiment of FIG. 4, the range of optimum HSYNC delay is between a falling edge of blue write signal 408 and a rising edge of HSYNC signal 402, as indicated by notation 412 on FIG. 4.

In the illustrated embodiment of FIG. 4, the rising and falling edges of charging signal 410 driven on one or more electrodes of touch sensor are synchronized to the falling edges of HSYNC signal 402. In some embodiments, the rising and falling edges of charging signal 410 may be synchronized to the rising edges of HSYNC signal 402. In certain embodiments, an HSYNC period (e.g., HSYNC period 1) may be in the order of 5 to 15 microseconds. As an example, HSYNC period 1 may be 6.5 microseconds (i.e., 16.6 milliseconds/2560 rows). Measured response signals from HSYNC period 1 and HSYNC period 2 may include measured voltages, time periods, or any other characteristic of the received signals.

In FIG. 4, controller 102 induces a positively polarized charge on an electrode (e.g., an electrode underlying row 201a of FIG. 2 or a combination of electrodes underlying several pixel rows 201 of FIG. 2) of touch sensor 101, which results in charging signal 410 of FIG. 4. Controller 102 then performs a positive integration (+) by sensing a first rising edge of charging signal 410 associated with the electrode during HSYNC period 1. Similarly, controller 102 induces a negatively polarized charge on the electrode of touch sensor 101 and performs a negative integration (−) by sensing a first falling edge of charging signal 410 associated with the electrode during HSYNC period 2. By alternating the polarity of applied charging signal 410 between positive and negative polarity for HSYNC periods 1 and 2, touch sensor controller 102 may reduce or eliminate noise since the amount of charge (i.e., noise) injected into system 100 equals the amount of charge (i.e., noise) taken out of system 100. Two HSYNC periods (e.g., HSYNC period 1 and HSYNC period 2) may be used per measurement cycle. Each measurement cycle is associated with an ADC sample (e.g., ADC sample 1). Touch sensor controller 102 repeats this application and measurement cycle a number of times to accumulate a predetermined number of samples (e.g., ADC samples 1 and 2) from one or more electrodes of touch sensor 101.

In certain embodiments, a touch electrode measurement is performed by averaging two or more samples (e.g., ADC samples 1 and 2). For example, a touch measurement may be performed by averaging four ADC samples that include four positive and negative integration pairs, which may be represented by "+−+−+−+−". In certain display modules (e.g., an in-cell display module), electrodes may be placed on top and/or underneath one or more pixel rows (e.g., rows 201a-n of FIG. 2) of touch sensor 101. As an example, a display module with 1080 pixel rows may include 27 electrodes. The 27 electrodes may be equally spaced such that each electrode is 40 rows wide. As another example, each electrode may be four rows wide. In certain embodiments, controller 102 performs an integration sequence (e.g., the eight integrations associated with the "+−+−+−+−" integration sequence) sequentially on a first electrode (e.g., an electrode underlying rows 201a-d of FIG. 2). The integrations may be synchronized to an HSYNC signal (e.g., HSYNC signal 402 of FIG. 4). After the integrations on the first electrode are completed, controller 102 may then perform the same integration sequence on a second electrode (e.g., a touch electrode underlying rows 201e-h of FIG. 2). In certain embodiments, this pattern is repeated until controller 102 performs the integration sequence on the last electrode.

While this standard phase shift, HSYNC delay method may reduce display measurement noise under various display backgrounds, it may also cause display flicker on certain pixel layer patterns, such as dot inverse pattern 200 of FIG. 2 and double dot inverse pattern 300 of FIG. 3, since no blanking time, or time when the display is not updating pixels, is available. Types of blanking time include a vertical blanking interval, which may occur between an end of a display frame and a beginning of a next display frame, and a horizontal blanking interval, which may occur between an end of a display row and a beginning of a next display row when no source data is written to the pixels. By changing the integration sequence between certain ADC samples, the phase of cross-talk between the display source data and the drive signals of controller 102 can be inversed. In certain embodiments, this sequence of positive integration (+), negative integration (−), negative integration (−), positive integration (+), and so forth, which can be represented by "+−−+", may reduce or eliminate flicker without degrading the touch measurement. Further, this "+−−+" integration sequence utilizes all available HSYNC periods, which is 100 percent efficient such that optimum report rate can be achieved.

A first sample measurement (e.g., ADC sample 1 of FIG. 4), which includes HSYNC periods 1 and 2, results in a positive integration (+) for the first type of noise (e.g., noise 210 of FIG. 2) and a negative integration (−) for the second type of noise (e.g., noise 212 of FIG. 2). Thus, an additional sample measurement may be needed to cancel out or significantly reduce the display noise. After performing the first positive integration during HSYNC period 1 and the first negative integration during HSYNC period 2, controller 102 then toggles charging signal 410 during HSYNC period 2, resulting in a second rising edge of charging signal 410. In certain embodiments, toggling charging signal 410 between ADC sample 1 and ADC sample 2 inverses the phase of cross-talk between display source data and charging signal 410, which may reduce flicker.

Toggling charging signal 410 reverses the polarity of charging signal 410. In certain instances, charging signal 410 is toggled from a high (e.g., positive) signal to a low (e.g., negative) signal. Similarly, in certain instances, charging signal 410 is toggled from a low signal to a high signal. In certain embodiments, charging signal 410 is toggled (i.e., reversed) so that the electrode on the next integration measurement can be charged in the same polarity as the current integration (e.g., the first negative integration during HSYNC 2). The toggling of charging signal 410 may occur after integration of charge is successfully completed (e.g., the first negative integration during HSYNC period 2) and before the subsequent HSYNC period begins (e.g., HSYNC period 3).

To obtain ADC sample 2, controller 102 induces a second negatively polarized charge on the electrode of touch sensor 101 and performs a second negative integration (−) by sensing a second negative edge of charging signal 410 associated with the electrode during HSYNC period 3. Similarly, controller 102 induces a positively polarized charge on the electrode of touch sensor 101 and performs a second positive integration (+) by sensing a third rising edge of charging signal 410 associated with the electrode during HSYNC period 4. A second sample measurement (e.g., ADC sample 2 of FIG. 4), which includes HSYNC periods 3 and 4, results in a positive integration (+) for the first type of noise and a negative integration for the second type of noise. Combining ADC samples 1 and 2 results in a positive integration (+) and negative integration (−) for the first type of noise and a negative integration (−) and positive integration (+) for the second type of noise which, in certain embodiments, may cancel out or significantly reduce flicker and display noise within four HSYNC periods.

Figure 5:
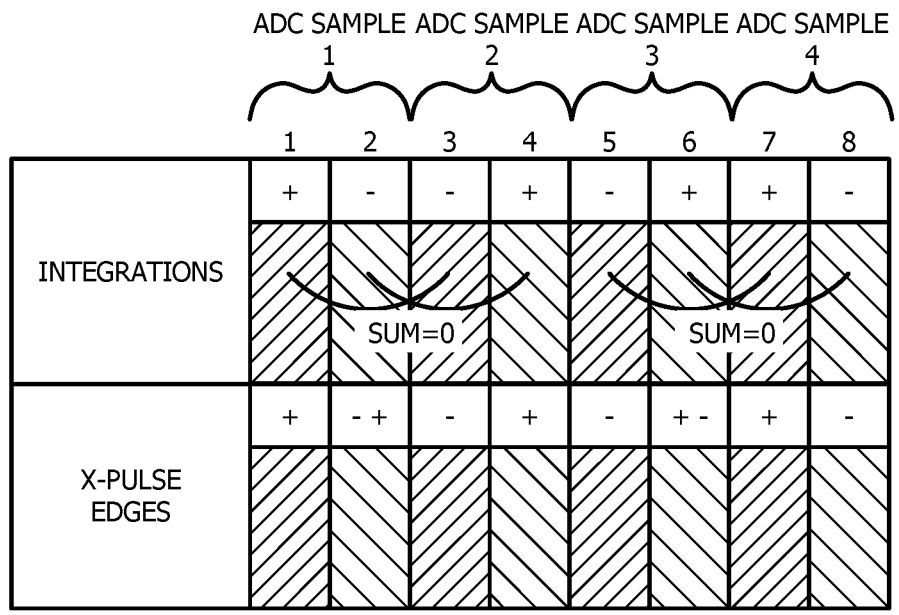
FIG. 5 illustrates an example integration sequence mapped onto a dot inverse pattern in accordance with embodiments of the present disclosure.
Figure 6:
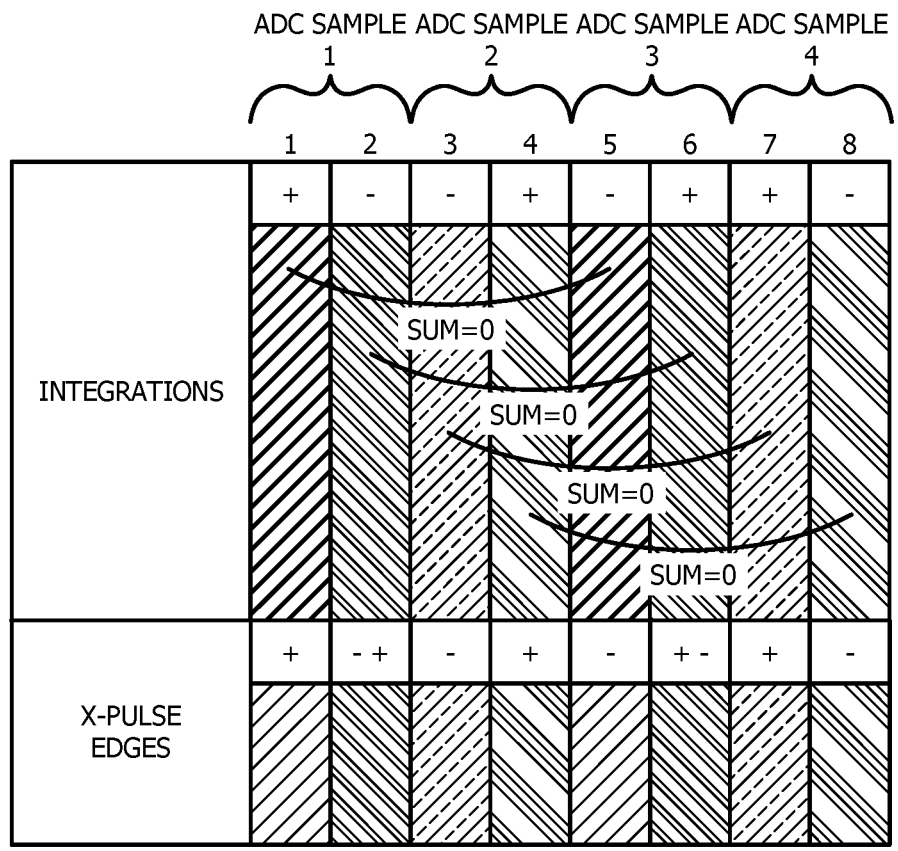
FIG. 6 illustrates an example integration sequence mapped onto a double dot inverse pattern in accordance with embodiments of the present disclosure.

FIGS. 5 and 6 illustrate how the "+−−+" sequence may reduce or eliminate display noise on a dot inverse pixel pattern and a double dot inverse pixel pattern, respectively, while at the same time reducing display flicker. FIG. 5 illustrates an example integration sequence mapped onto a dot inverse pattern (e.g., dot inverse pattern 200 of FIG. 2) in accordance with embodiments of the present disclosure. The 12 columns of FIG. 5 represent 12 consecutive HSYNC periods (HSYNC period 1, HSYNC period 2, HSYNC period 3, and so on). Each HSYNC period is associated with an electrode underlying one or more pixel rows (e.g., one or more pixel rows 201 of FIG. 2) of touch sensor 101. Pixel rows 201 are associated with two types of noise (e.g., noise 210 and noise 212 of FIG. 2).

In the illustrated embodiment of FIG. 5, HSYNC periods 1, 3, 5, and 7 are associated with a first type of noise (e.g., first type of noise 210 of FIG. 2), and HSYNC periods 2, 4, 6, and 8 are associated with a second type of noise (e.g., second type of noise 212 of FIG. 2). HSYNC periods 1, 4, and 7 are each associated with a rising x-pulse edge (+), HSYNC periods 3, 5, and 8 are each associated with a falling x-pulse edge (−), and HSYNC periods 2 and 6 are each associated with both a rising and falling x-pulse edge ("−+" for HSYNC period 2 and "+−" for HSYNC period 6) since the charging signal is toggled during HSYNC periods 2 and 6. HSYNC periods 1 through 4 follow the "+−−+" integration sequence and HSYNC periods 5 through 8 follow the "−++−" integration sequence such that HSYNC periods 1, 4, 6, and 7 represent positive integrations (+) and HSYNC periods 2, 3, 5, and 8 represent negative integrations (−). Each of these integration sequences may cancel out or significantly reduce the two types of display noise, as described below.

HSYNC periods 1 and 3, which are associated with the first type of noise, represent a positive integration (+) and a negative integration (−), respectively, thereby cancelling out or significantly reducing the first type of noise (i.e., sum+/−=0). HSYNC periods 2 and 4, which are associated with the second type of noise, represent a negative integration (−) and a positive integration (+), thereby cancelling out or significantly reducing the second type of noise (i.e., sum −/+=0). Thus, the "+−−+" integration sequence may be used to cancel out or significantly reduce noise in displays with a dot inverse pattern within four HSYNC periods and two associated ADC samples (ADC sample 1 associated with HSYNC periods 1 and 2 and ADC sample 2 associated with HSYNC periods 3 and 4).

In the illustrated embodiment of FIG. 5, HSYNC periods 5 and 7, which are associated with the first type of noise, represent a negative integration (−) and a positive integration (+), respectively, thereby cancelling out or significantly reducing the first type of noise (i.e., sum −/+=0). HSYNC periods 6 and 8, which are associated with the second type of noise, represent a positive integration (+) and a negative integration (−), thereby cancelling out or significantly reducing the second type of noise (i.e., sum+/−=0). Thus, the "−++−" integration sequence may be used to cancel out or significantly reduce noise in displays with a dot inverse pattern within ADC samples 3 and 4 (ADC sample 3 associated with HSYNC periods 5 and 6 and ADC sample 4 associated with HSYNC periods 7 and 8).

FIG. 6 illustrates an example integration sequence mapped onto a double dot inverse pattern (e.g., dot inverse pattern 300 of FIG. 3) in accordance with embodiments of the present disclosure. Similar to FIG. 5, the 8 columns of FIG. 6 represent 8 consecutive HSYNC periods (HSYNC period 1, HSYNC period 2, HSYNC period 3, and so on). However, the HSYNC periods of FIG. 6 are associated with four types of noise.

In the illustrated embodiment of FIG. 6, HSYNC periods 1 and 5 are associated with a first type of noise (e.g., first type of noise 320 of FIG. 3), HSYNC periods 2 and 6 are associated with a second type of noise (e.g., second type of noise 322 of FIG. 3), HSYNC periods 3 and 7 are associated with a third type of noise (e.g., third type of noise 324 of FIG. 3), and HSYNC periods 4 and 8 are associated with a fourth type of noise (e.g., fourth type of noise 326 of FIG. 3). HSYNC periods 1, 4, and 7 are each associated with a rising x-pulse edge (+), HSYNC periods 3, 5, and 8 are each associated with a falling x-pulse edge (−), and HSYNC periods 2 and 6 are each associated with both a rising and falling x-pulse edge ("−+" for HSYNC period 2 and "+−" for HSYNC period 6) since the charging signal is toggled during HSYNC periods 2 and 6. HSYNC periods 1, 4, 6, and 7 represent positive integrations (+) and HSYNC periods 2, 3, 5, and 8 represent negative integrations (−). This "+−−+−++−" integration sequence may cancel out or significantly reduce the four types of display noise, as described below.

As shown in FIG. 6, HSYNC periods 1 and 5, which are associated with the first type of noise, represent a positive integration (+) and a negative integration (−), respectively, thereby cancelling out the first type of noise (i.e., sum+/−=0). HSYNC periods 2 and 6, which are associated with the second type of noise, represent a negative integration (−) and a positive integration (+), thereby cancelling out the second type of noise (i.e., sum −/+=0). HSYNC periods 3 and 7, which are associated with the third type of noise, represent a negative integration (−) and a positive integration (+), thereby cancelling out the third type of noise (i.e., sum −/+=0). And HSYNC periods 4 and 8, which are associated with the fourth type of noise, represent a positive integration (+) and a negative integration (−), thereby cancelling out the fourth type of noise (i.e., sum+/−/0=0). Thus, the "+−−+−++−" integration sequence may be used to cancel out noise in displays with a double dot inverse pattern within 8 HSYNC periods and four ADC samples (ADC sample 1 associated with HSYNC periods 1 and 2, ADC sample 2 associated with HSYNC periods 3 and 4, ADC sample 3 associated with HSYNC periods 5 and 6, and ADC sample 4 associated with HSYNC periods 7 and 8).

Figure 7:
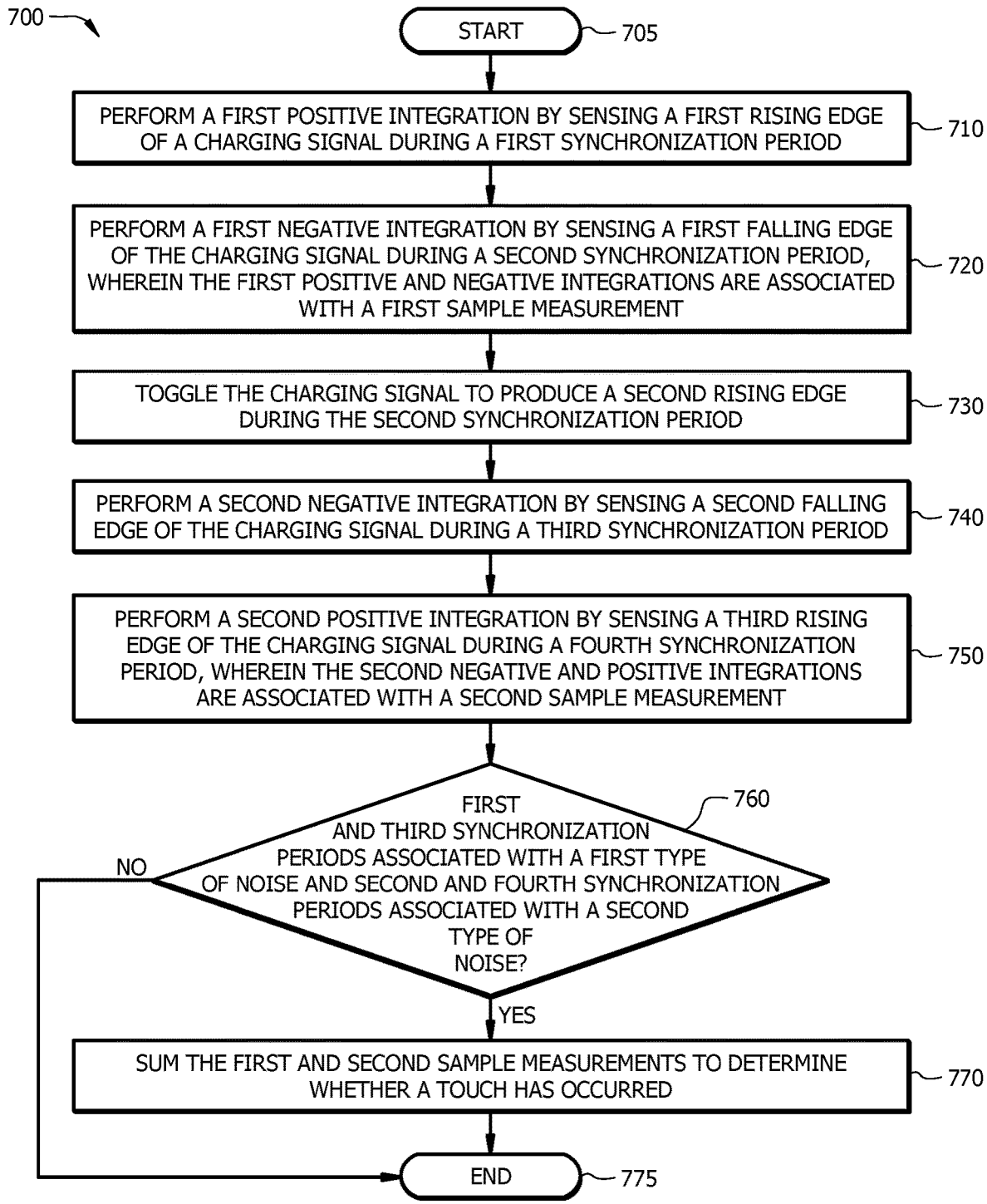
FIG. 7 illustrates an example method of performing an integration sequence in accordance with embodiments of the present disclosure.

FIG. 7 illustrates an example method 700 of performing an integration sequence in accordance with embodiments of the present disclosure. Performing integrations in accordance with method 700 may, in certain embodiments, reduce or eliminate flicker and noise associated with a dot inverse pattern of a pixel layer of a touch sensor device. Method 700 may be performed by logic (e.g., hardware or software) of a touch sensor controller (e.g., controller 102 of FIG. 1A). For example, method 700 may be performed by executing (with one or more processors of the touch sensor controller) instructions stored in a computer-readable medium of the touch sensor controller.

Method 700 represents a "+−−+" integration sequence. The method starts at step 705. At step 710, a first positive integration (+) is performed by sensing a first rising edge of a charging signal associated with an electrode of a touch sensor of a device during a first synchronization period (e.g., HSYNC period 1 of FIG. 4). Method 700 then moves to step 720, where a first negative integration (−) is performed by sensing a first falling edge of the charging signal associated with the electrode of the touch sensor during a second synchronization period (e.g., HSYNC period 2 of FIG. 4). The first positive integration (+) and the first negative integration (−) are associated with a first sample measurement (e.g, ADC sample 1 of FIG. 4). At step 730, the charging signal is toggled, resulting in a second rising edge of the charging signal during the second synchronization period (e.g., HSYNC period 2 of FIG. 4). In certain embodiments, the electrode comprises several electrodes (e.g., 40 electrodes). For example, 40 electrodes underlying 40 adjacent pixel rows may be electrically and/or physically coupled to form the electrode.

At step 740 of method 700, a second negative integration (−) is performed by sensing a second falling edge of the charging signal associated with the electrode of the touch sensor during a third synchronization period (e.g., HSYNC period 3 of FIG. 4). Method 700 then moves to step 750, where a second positive integration (+) is performed by sensing a third rising edge of the charging signal associated with the electrode of the touch sensor during a fourth synchronization period (e.g., HSYNC period 4 of FIG. 4). The second negative integration (−) and the second positive integration (+) are associated with a second sample measurement (e.g, ADC sample 2 of FIG. 4).

At step 760, method 700 determines whether the first and third synchronization periods of method 700 are associated with a first type of noise (e.g., noise 210 produced by dot inverse pattern 200 of FIG. 2) and the second and fourth synchronization periods of method 700 are associated with a second type of noise (e.g., noise 212 produced by dot inverse pattern 200 of FIG. 2). If the determination at step 760 is affirmative, then method 700 moves to step 770, where the first and second sample measurements (e.g., ADC sample 1 and ADC sample 2) are summed to cancel out the first type of noise and the second type of noise within the four synchronization periods and a determination is made as to whether a touch has occurred within a touch sensitive area of touch sensor 101. If the determination at step 760 is negative, method 700 moves to step 775, where method 700 ends.

Method 700 may include more or less steps than those illustrated in FIG. 7. For example, step 760 of method 700 may be eliminated if, for instance, the nature of the noise has already been established. Under such circumstances, step 750 of method 700 may proceed directly to step 770. As another example, while method 700 illustrates "+−−+" integration sequence as it relates to two types of noise (e.g., two types of noise produced by a dot inverse pixel pattern), one of ordinary skill in the art will appreciate that in another embodiment, method 700 can be modified to illustrate "+−−+−++−" integration sequence as it relates to four types of noise (e.g., noise 320, 322, 324, and 326 produced by a double dot inverse pattern 300 of FIG. 3).

In certain embodiments, method 700 performs an integration sequence (e.g., the "+−−+" integration sequence or the "+−−+−++−" integration sequence) on two or more electrodes. As an example, method 700 may perform the "+−−+" integration sequence on a first electrode. After the four integrations of the "+−−+" integration sequence are completed on the first electrode, method 700 may then perform the "+−−+" integration sequence on a second electrode. Similarly, after the four integrations of the "+−−+" integration sequence are completed on the second electrode, method 700 may perform the "+−−+" integration sequence on a third electrode, and so on until method 700 performs the "+−−+" integration sequence on all electrodes of the touch sensor.

Although this disclosure describes and illustrates particular steps of the method of FIG. 7 as occurring in a particular order, this disclosure contemplates any steps of the method of FIG. 7 occurring in any order. An embodiment can repeat or omit one or more steps of the method of FIG. 7. In certain embodiments, a particular component (e.g., touch sensor controller 102) performing an action encompasses a component causing another component to perform the action. Moreover, although this disclosure describes and illustrates an example method of performing an integration sequence including the particular steps of the method of FIG. 7, this disclosure contemplates any method of performing an integration sequence including any steps, which can include all, some, or none of the steps of the method of FIG. 7. Moreover, although this disclosure describes and illustrates particular components carrying out particular steps of the method of FIG. 7, this disclosure contemplates any combination of any components carrying out any steps of the method of FIG. 7.

Herein, a computer-readable non-transitory storage medium or media may include one or more semiconductor-based or other ICs (such, as for example, field-programmable gate arrays (FPGAs) or ASICs), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these. A computer-readable non-transitory storage medium may be volatile, non-volatile, or a combination of volatile and non-volatile.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses a myriad of changes, substitutions, variations, alterations, and modifications to the example embodiments herein that a person having ordinary skill in the art would comprehend. Similarly, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A device, comprising:
a touch sensor comprising a plurality of electrodes; and
a controller coupled to the touch sensor, the controller comprising logic configured, when executed, to cause the controller to:
  perform a first positive integration by sensing a first rising edge of a charging signal associated with an electrode of the plurality of electrodes during a first synchronization period;
  perform a first negative integration by sensing a first falling edge of the charging signal associated with the electrode of the plurality of electrodes during a second synchronization period, wherein the first positive integration and the first negative integration are associated with a first sample measurement;
  toggle the charging signal, resulting in a second rising edge of the charging signal during the second synchronization period;
  perform a second negative integration by sensing a second falling edge of the charging signal associated with the electrode of the plurality of electrodes during a third synchronization period; and
  perform a second positive integration by sensing a third rising edge of the charging signal associated with the electrode of the plurality of electrodes during a fourth synchronization period, wherein the second negative integration and the second positive integration are associated with a second sample measurement;
  wherein the first, second, third, and fourth synchronization periods occur consecutively.

2. The device of claim 1, wherein:
the first and third synchronization periods are associated with a first type of noise;
the second and fourth synchronization periods are associated with a second type of noise; and
the summation of the first and second sample measurements cancel out the first type of noise and the second type of noise within the four synchronization periods.

3. The device of claim 1, wherein the logic is further configured, when executed, to cause the controller to:
  perform a third negative integration by sensing a third falling edge of the charging signal associated with a second electrode of the plurality of electrodes during a fifth synchronization period;
  perform a third positive integration by sensing a fourth rising edge of the charging signal associated with the second electrode of the plurality of electrodes during a sixth synchronization period, wherein the third negative integration and the third positive integration are associated with a third sample measurement;
  toggle the charging signal, resulting in a fourth falling edge of the charging signal during the sixth synchronization period;
  perform a fourth positive integration by sensing a fifth rising edge of the charging signal associated with the second electrode of the plurality of electrodes during a seventh synchronization period; and
  perform a fourth negative integration by sensing a fifth falling edge of a charging signal associated with the second electrode of the plurality of electrodes during an eighth synchronization period, wherein the fourth positive integration and the fourth negative integration are associated with a fourth sample measurement.

4. The device of claim 3, wherein:
the first and fifth synchronization periods represent a first type of noise;
the second and sixth synchronization periods represent a second type of noise;
the third and seventh synchronization periods represent a third type of noise;
the fourth and eighth synchronization periods represent a fourth type of noise; and
a summation of the first, second, third, and fourth sample measurements cancel out the first, second, third, and fourth types of noise within the eight synchronization periods.

5. The device of claim 1, wherein the device comprises a hybrid in-cell liquid crystal display ("LCD"), the LCD comprising one from a set of:
  a checkerboard dot inverse pattern that produces a first and second type of noise; and
  a checkerboard double dot inverse pattern that produces a first, second, third, and fourth type of noise.

6. The device of claim 1, wherein the electrode of the plurality of electrodes comprises two or more electrically coupled electrodes that are positioned horizontally underneath adjacent pixel rows of a display of the device.

7. One or more computer-readable non-transitory storage media embodying logic that is operable when executed to:
perform a first positive integration by sensing a first rising edge of a charging signal associated with an electrode of a plurality of electrodes of a touch sensor during a first synchronization period;
perform a first negative integration by sensing a first falling edge of the charging signal associated with the electrode of the plurality of electrodes during a second synchronization period, wherein the first positive integration and the first negative integration are associated with a first sample measurement;
toggle the charging signal, resulting in a second rising edge of the charging signal during the second synchronization period;
perform a second negative integration by sensing a second falling edge of the charging signal associated with the electrode of the plurality of electrodes during a third synchronization period; and
perform a second positive integration by sensing a third rising edge of the charging signal associated with the electrode of the plurality of electrodes during a fourth synchronization period, wherein the second negative integration and the second positive integration are associated with a second sample measurement;
wherein the first, second, third, and fourth synchronization periods occur consecutively.

8. The media of claim 7, wherein:
the first and third synchronization periods are associated with a first type of noise;
the second and fourth synchronization periods are associated with a second type of noise; and
the summation of the first and second sample measurements cancel out the first type of noise and the second type of noise within the four synchronization periods.

9. The media of claim 7, wherein the logic is further operable when executed to:
perform a third negative integration by sensing a third falling edge of the charging signal associated with a second electrode of the plurality of electrodes during a fifth synchronization period;
perform a third positive integration by sensing a fourth rising edge of the charging signal associated with the second electrode of the plurality of electrodes during a sixth synchronization period, wherein the third negative integration and the third positive integration are associated with a third sample measurement;
toggle the charging signal, resulting in a fourth falling edge of the charging signal during the sixth synchronization period;
perform a fourth positive integration by sensing a fifth rising edge of the charging signal associated with the second electrode of the plurality of electrodes during a seventh synchronization period; and
perform a fourth negative integration by sensing a fifth falling edge of a charging signal associated with the second electrode of the plurality of electrodes during an eighth synchronization period, wherein the fourth positive integration and the fourth negative integration are associated with a fourth sample measurement.

10. The media of claim 9, wherein:
the first and fifth synchronization periods represent a first type of noise;
the second and sixth synchronization periods represent a second type of noise;
the third and seventh synchronization periods represent a third type of noise;
the fourth and eighth synchronization periods represent a fourth type of noise; and
a summation of the first, second, third, and fourth sample measurements cancel out the first, second, third, and fourth types of noise within the eight synchronization periods.

11. The media of claim 7, wherein the touch sensor is associated with a hybrid in-cell liquid crystal display ("LCD"), the LCD comprising one from a set of:
a checkerboard dot inverse pattern that produces a first and second type of noise; and
a checkerboard double dot inverse pattern that produces a first, second, third, and fourth type of noise.

12. The media of claim 7, wherein the electrode of the plurality of electrodes comprises two or more electrically coupled electrodes that are positioned horizontally underneath adjacent pixel rows of a display of a device.

13. A method, comprising:
performing a first positive integration by sensing a first rising edge of a charging signal associated with an electrode of a plurality of electrodes of a touch sensor during a first synchronization period;
performing a first negative integration by sensing a first falling edge of the charging signal associated with the electrode of the plurality of electrodes during a second synchronization period, wherein the first positive integration and the first negative integration are associated with a first sample measurement;
toggling the charging signal, resulting in a second rising edge of the charging signal during the second synchronization period;
performing a second negative integration by sensing a second falling edge of the charging signal associated with the electrode of the plurality of electrodes during a third synchronization period; and
performing a second positive integration by sensing a third rising edge of the charging signal associated with the electrode of the plurality of electrodes during a fourth synchronization period, wherein the second negative integration and the second positive integration are associated with a second sample measurement;
wherein the first, second, third, and fourth synchronization periods occur consecutively.

14. The method of claim 13, wherein:
the first and third synchronization periods are associated with a first type of noise;
the second and fourth synchronization periods are associated with a second type of noise; and
the summation of the first and second sample measurements cancel out the first type of noise and the second type of noise within the four synchronization periods.

15. The method of claim 13, further comprising:
performing a third negative integration by sensing a third falling edge of the charging signal associated with the electrode of the plurality of electrodes during a fifth synchronization period;
performing a third positive integration by sensing a fourth rising edge of the charging signal associated with the electrode of the plurality of electrodes during a sixth synchronization period, wherein the third negative integration and the third positive integration are associated with a third sample measurement;

toggling the charging signal, resulting in a fourth falling edge of the charging signal during the sixth synchronization period;

performing a fourth positive integration by sensing a fifth rising edge of the charging signal associated with the electrode of the plurality of electrodes during a seventh synchronization period; and performing a fourth negative integration by sensing a fifth falling edge of a charging signal associated with the electrode of the plurality of electrodes during an eighth synchronization period, wherein the fourth positive integration and the fourth negative integration are associated with a fourth sample measurement.

16. The method of claim 15, wherein:
the first and fifth synchronization periods represent a first type of noise;
the second and sixth synchronization periods represent a second type of noise;
the third and seventh synchronization periods represent a third type of noise;
the fourth and eighth synchronization periods represent a fourth type of noise; and
a summation of the first, second, third, and fourth sample measurements cancel out the first, second, third, and fourth types of noise within the eight synchronization periods.

17. The method of claim 13, wherein the electrode of the plurality of electrodes comprises two or more electrically coupled electrodes that are positioned horizontally underneath adjacent pixel rows of a display of a device.

* * * * *